(12) United States Patent
Hatzav et al.

(10) Patent No.: US 8,136,966 B2
(45) Date of Patent: Mar. 20, 2012

(54) LIGHT MIXING CHAMBER

(75) Inventors: Iuval Hatzav, Culver City, CA (US);
Ilan Ben-Shahar, Savion (IL); Giyora Sharaby, Moshav Neve Yarak (IL);
Daniel Hatzav, Hod Hasharon (IL)

(73) Assignee: CSSN Inc., Culver City, CA (US)

( * ) Notice: Subject to any disclaimer, the term of this patent is extended or adjusted under 35 U.S.C. 154(b) by 502 days.

(21) Appl. No.: 12/393,504

(22) Filed: Feb. 26, 2009

(65) Prior Publication Data

US 2010/0213392 A1   Aug. 26, 2010

(51) Int. Cl.
*F21V 5/00* (2006.01)
(52) U.S. Cl. .......................... 362/317; 362/323; 362/329
(58) Field of Classification Search .................. 362/317, 362/299, 301, 323, 329, 367
See application file for complete search history.

(56) References Cited

U.S. PATENT DOCUMENTS 3,056,897 A * 10/1962 Knochel et al. ............... 313/483
3,056,898 A * 10/1962 Knochel et al. ............... 313/483
3,121,817 A *  2/1964 Saviers ......................... 313/512

* cited by examiner

*Primary Examiner* — David V Bruce (57) ABSTRACT

An illumination chamber for illuminating an object with substantially uniform illumination and providing an image of the object, the illumination chamber includes a generally 6-faced polyhedron opaque housing, which encloses a light mixing chamber. The housing includes an object transparent glass sheet, an image transparent glass sheet and at least one light source disposed inside the housing. The object transparent glass sheet is disposed at a first of the two larger faces of the 6-faced polyhedron and image transparent glass sheet is disposed at the second large face of the 6-faced polyhedron, opposing the object glass sheet. The object to be imaged, typically a document, is disposed immediately adjacent to the external surface of the object transparent glass sheet. The image of the objects exits the housing through the image transparent glass sheet.

22 Claims, 10 Drawing Sheets

Fig. 6
Cross-section AA'

Fig. 8
Cross-section CC'

Fig. 9
DETAILED D

LIGHT MIXING CHAMBER

FIELD OF THE INVENTION

The present invention relates to illumination systems and methods and more particularly, to a light mixing chamber for illuminating an object with an illumination which is substantially uniform.

BACKGROUND OF THE INVENTION

There exist in today's market devices, such as document scanners, which serve applications for which it is desirable to illuminate the scanned object, typically a document, with substantially uniform illumination. The scanned documents, for example ID cards, drivers' license, business cards and the like, are typically analyzed to extract information from the scanned document and non-uniform illumination degrades the ability to extract the desired information.

Illumination coming from external sources such as room illumination often creates uncontrolled reflections on the scanned document, thereby distorting the image of the scanned document. Internal light sources may also bring about problems of reflections that distort the uniformity of the illumination of the scanned document, thereby causing the image of the scanned document not to be a substantially true image of the scanned document.

Figure 1A:
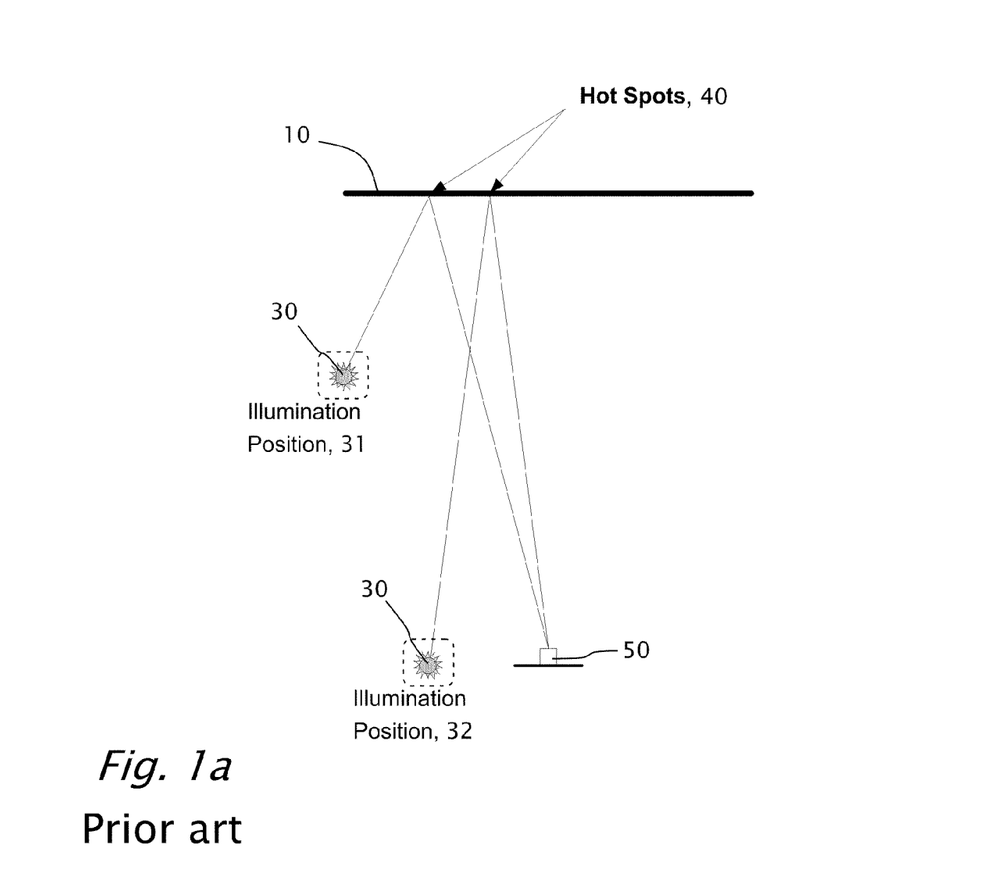
FIG. 1a (Prior art) illustrates the hot spot problem caused by direct illumination of the scanned document or external light sources.
Figure 1B:
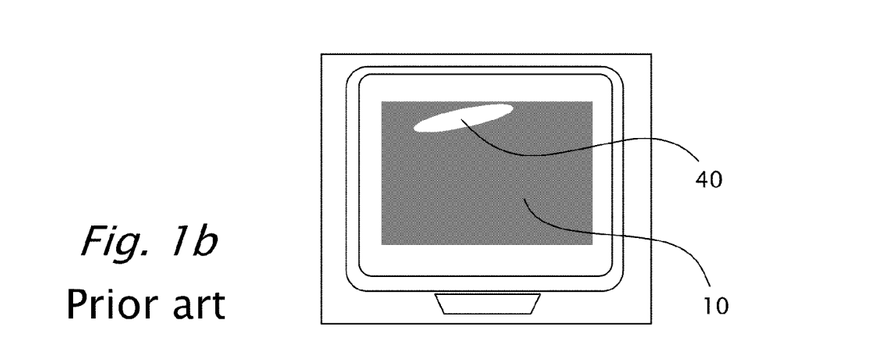
FIG. 1b (Prior art) depicts a hot spot caused by direct illumination of the scanned document and clear window in front of the scanned document.

When imaging a document with a camera, the document needs to be illuminated. Reference is made to FIGS. 1a (Prior art) and 1b (Prior art). FIG. 1a illustrates how hot spots 40 are formed by direct illumination of document 10. In conventional illumination methods, an example of which is shown in FIG. 1a, illumination positions 31 and 32 enable the return of the majority of light from document 10 to the lens of camera 50, but give rise to a problem known in the art as hot spot, where the light source (30) itself is imaged by camera 50. FIG. 1b depicts hot spot 40 caused by direct illumination of the scanned document 10 or by light entering the chamber from external source, for example thorough bare areas of the scanner glass window.

Figure 2:
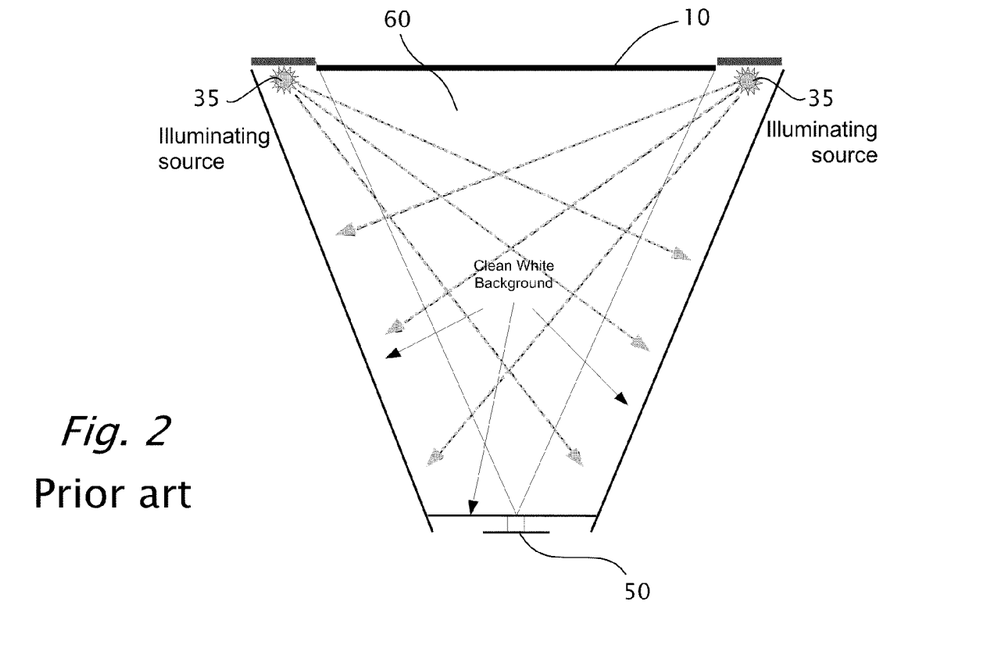
FIG. 2 (Prior art) illustrates a lighting configuration of a scanner having a light camber that provides uniform illumination.

US application 20080285094 (US20080285094) by Iuval Hatzav et al, the disclosure of which is included herein by reference, provides a closed illumination chamber that yields uniform illumination of a document to be imaged. Referring to FIG. 2 (Prior art), a scanner with an illumination chamber 60, as provided by US20080285094, is shown. Light source 35 is disposed such that light source 35 is hidden from camera 50 and thereby cannot form a hot spot. But the device provided by US20080285094 is relatively large in size for a portable device.

Thus there is a need for and it would be advantageous to have a light mixing chamber for illuminating an object with substantially uniform illumination which is relatively small in size.

The terms "ray", "light ray" and "light wave" are used herein interchangeably.

The terms "illumination chamber" and "light mixing chamber" are used herein interchangeably.

Angle of Incidence and Critical Angle

In geometric optics, the "angle of incidence" is the angle between a ray incident on a surface and the line perpendicular to the surface at the point of incidence, called the normal (N). The principle of Fresnel's equations, explains the reflection and the refraction of waves as the move from one medium, having one refractive index ($n_1$) to another medium, having a second refractive index ($n_2$). As a wave moves from one medium, having one refractive index to another medium, having a different refractive index, the point of incident acts as a new wave source, and one portion of the wave energy reflect back into the first medium and another portion penetrates through the second medium. Typically, glass has a refractive index n of ~1.5 and air has a refractive index n of ~1.0.

Further more, according to the principle of Huygens, when a ray hits a reflective surface, the point of incidence is in fact the center of a fresh disturbance and the source of a new train of light waves, and that the advancing wave as a whole may be regarded as the sum of all the secondary waves arising from points in the medium already traversed.

Figure 3:
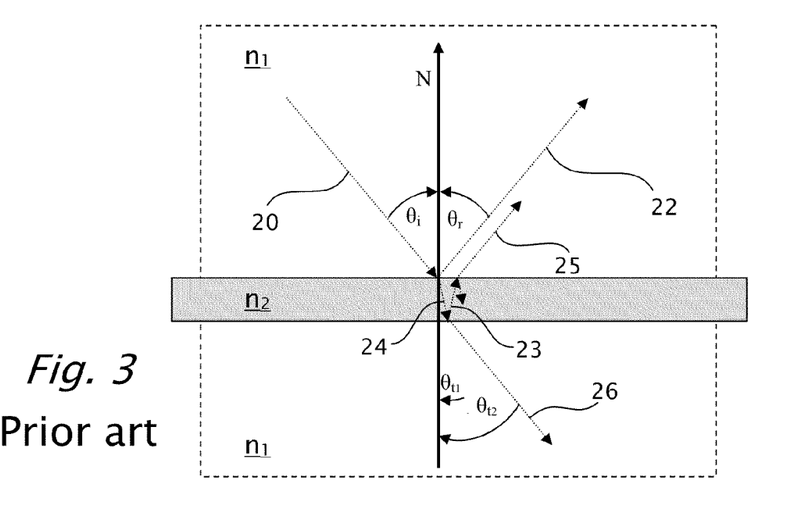
FIG. 3 (Prior art) illustrates a light wave moving through a medium having a refractive index $n_1$, hitting another medium, having a refractive index $n_2$ and then again, moving into the medium having a refractive index $n_1$.

FIG. 3 (Prior art) illustrates light wave 20 moving through a medium having a refractive index $n_1$, hitting another medium, having a refractive index $n_2$ and then again, moving into the medium having a refractive index $n_1$. Light wave 20 moves through the medium having a refractive index $n_1$ and hits the medium having a refractive index $n_2$ at an angle of incidence $\theta_i$. Part of the wave light energy reflects back at an angle $\theta_r$, whereas $\theta_r=\theta_i$, forming light wave 22. The other part of light wave 20, light wave 24, moves through the medium having a refractive index $n_2$, but angle $\theta_i$ changes to $\theta_{t1}$, depending on the ratio between $n_1$ and $n_2$. The relation between $\theta_i$ and $\theta_{t1}$ is given by the following equation (Snell's law):

$$n_1 \sin(\theta_i) = n_1 \sin(\theta_{t1}) \qquad (1)$$

As light wave 24 moves through the medium having a refractive index $n_2$ until wave 24 hits another medium layer having a refractive index $n_1$. Light wave 24 splits to reflective portion 23 and to refractive portion 24: reflective portion 23 returns at an angle equal to $\theta_{t1}$, and refractive portion 24 proceeds at an angle which changes from $\theta_{t1}$ to $\theta_{t2}$.

The energy distribution of the reflective portion 23 and to refractive portion 24, respectively, can be shown by Fresnel equations. When the light wave is at near-normal incidence to the interface ($\theta_i \approx \theta_{t1} \approx 0$), the reflection coefficient R and transmission coefficient T are given by:

$$R = \left(\frac{n_1 - n_2}{n_1 - n_2}\right)^2 \qquad (2)$$

$$T = 1 - R = \frac{4 n_1 n_2}{(n_1 - n_2)^2} \qquad (3)$$

whereas for common glass, the reflection coefficient is about 4%.

It should be noted that in a partially transparent glass more rays are reflected back. The glass can be coated by materials having a refractive index n typically in the range of 2.7-5.0.

SUMMARY OF THE INVENTION

In view of the limitations now presented in the prior art, the intention of the present invention includes providing a new and useful system that can enhance the quality of scanned documents and which is small in size.

According to the teachings of the present invention, there is provided an illumination chamber for illuminating an object with substantially uniform illumination and providing an image of the object, the illumination chamber includes a generally rectangular 6-faced polyhedron parallelepiped opaque housing, which encloses an light mixing chamber, the housing including: (a) an object transparent glass sheet; (b) an image transparent glass sheet; and (c) at least one light source disposed inside the housing.

The object transparent glass sheet is disposed at a first of the two larger faces of the rectangular 6-faced polyhedron housing and the image transparent glass sheet is disposed at the second large face of the rectangular 6-faced polyhedron housing, opposing the object glass sheet. The object to be imaged, typically a document, is disposed immediately adjacent to the external surface of the object transparent glass sheet. The image of the objects exits the housing through the image transparent glass sheet. The term "immediately adjacent" as used herein refers to the distance between the object being illuminated and the external surface of the object transparent glass sheet, being less than the distance between the object transparent glass sheet and the image transparent glass sheet.

The at least one light source may be a LED light source, a halogen light source or any light source selected from the group of light source types, including: Infra Red (IR), ultra violet (UV), near UV (NUV), visible light (VL) and fluorescence light. Optionally, a light reflector is disposed behind the one or more light sources on the inner surface of the side wall of the housing, where the light source is disposed.

The at least one light source is preferably disposed closer to the image transparent glass sheet with respect to the object transparent glass sheet, and wherein the light source illuminates the image transparent glass sheet with an incident angle, preferably larger than 80°. The large incident angle can also be obtained by disposing the light source distally for the nearest edge of the image transparent glass sheet.

For the sake of clarity, all the walls of the housing are opaque, except for the two transparent glass sheets. The inner surface of the housing walls, are preferably covered by white and optically diffusive material. At least a portion of the inner surface of the housing side walls may be covered by white and optically brilliant material.

In embodiments of the present invention, up to three of the inner surface of the side walls of the housing may by covered by mirrors, provided that at least one of the inner walls of the housing includes one or more light source.

In embodiments of the present invention, the image glass sheet is only partially transparent to further prevent light rays, not coming from the document, to reach the imaging device, disposed on the other side of the glass sheet.

An aspect of the present invention is to provide methods of using the illumination chamber of the present invention to perform document imaging.

An aspect of the present invention is to provide methods of using the illumination chamber of the present invention to uniformly illuminate pictures.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

By way of introduction, the present invention is an improved illumination chamber for illuminating an object, typically a document, with substantially uniform illumination. The light mixing chamber will be described hereon in terms of an illumination chamber for a document scanner, but the present invention is not limited to utilize the illumination chamber for a document scanner and can be used in any application requiring uniform illumination of an object, for example, illuminating pictures in uniform light.

An aspect of the illumination chamber of the present invention is being very small in size relatively to prior art illumination chambers, typically used for documents scanners, such as scanner for scanning business cards, ID cards, passports and the like documents. The illumination chamber typically includes multiple light sources, such as LED light sources (hereinafter referred to as LED) and/or halogen light sources, the light sources being outside the field of view (FOV) of a viewer, such as a camera, and thereby no direct light rays can reach the camera. The light source is disposed, with respect to the surface of the glass disposed at the image acquisition side of the illumination chamber, such that the smallest angle of incidence θ of rays hitting the glass surface is larger than 45°, and is typically in the range of 80°-~90°. Hence, most of the rays coming directly from the light source and hit the glass surface and reflect back and only a very small portion of the rays coming directly from the light source will go through the glass (less than 20% of the original intensity) and only a small portion thereof proceed beyond the glass (less than 7% of the original intensity) and at an angle substantially the same as the incident angle of the ray coming directly from the light source.

It should be noted that range of preferred angle of incidence θ of rays, hitting the surface of the glass disposed at the image acquisition side of the illumination chamber, is 80°-~90°. But the angle can be smaller than 80°, resulting with a larger amount light passes through the glass sheet and thereby a smaller amount light reflects back into the chamber.

The illumination chamber is typically a rectangular 6-faced polyhedron, whereas the document is disposed at one of the large glass faces of the rectangular 6-faced polyhedron and the light rays, carrying the image of the document are exiting the illumination chamber from the opposing glass face of the rectangular 6-faced polyhedron.

Figure 4:
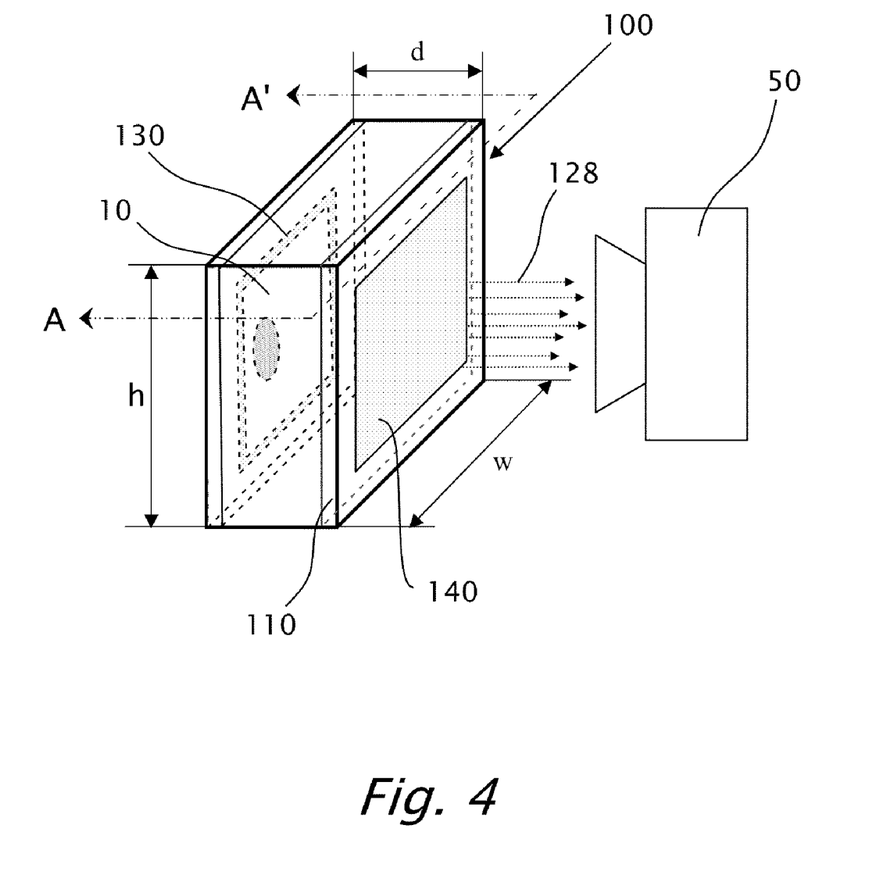
FIG. 4 illustrates a perspective view of an enclosed illumination chamber, according to embodiments of the present invention.
Figure 5:
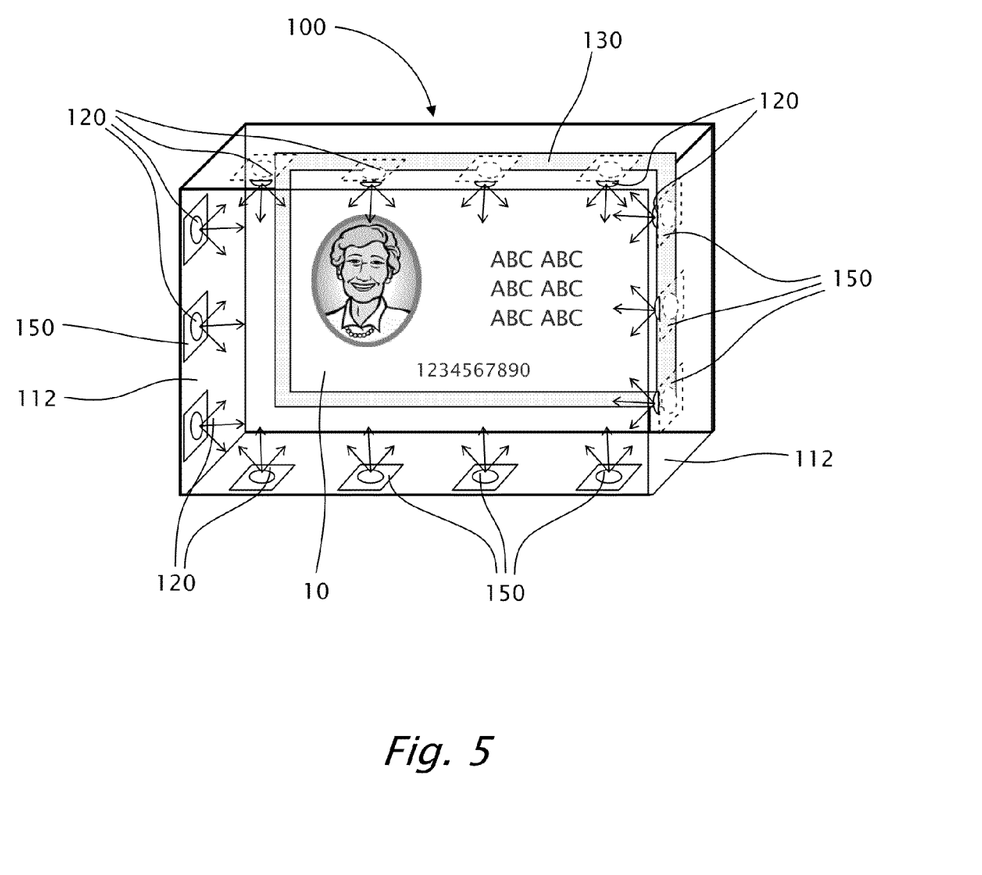
FIG. 5 illustrates a front perspective view of the illumination chamber shown in FIG. 4, having the image transparent glass removed for illustrative purposes only.

FIG. 4 illustrates a perspective view of an enclosed illumination chamber 100 providing substantially uniform illumination of a document 10, according with the preferred embodiment of the present invention. Illumination chamber 100 includes a generally rectangular 6-faced polyhedron opaque housing 110 enclosing the light mixing chamber, transparent window 130 and transparent window 140. Windows 130 and 140 are made of rigid, substantially flat and substantially transparent materials such as glass. Windows 130 and 140 are also referred to as "glass" or "glass sheets". Reference is also made to FIG. 5, which illustrates a front perspective view of illumination chamber 100, shown in FIG. 4, having transparent glass 140 removed, for illustrative purposes only. Illumination chamber 100 further includes light sources 120 such as LEDs and/or halogens, and optionally, mirrors 150 behind light sources 120, to intensify reflectivity. In embodiments of the present invention, to reduce the number of light sources 120, a mirror 170 is disposed on the inner surface of side wall 112 opposing the inner surface of another side wall 112, on which one or more light sources 120 are disposed. The inner surface of side walls 112 are preferably covered by white and optically diffusive material.

Figure 6:
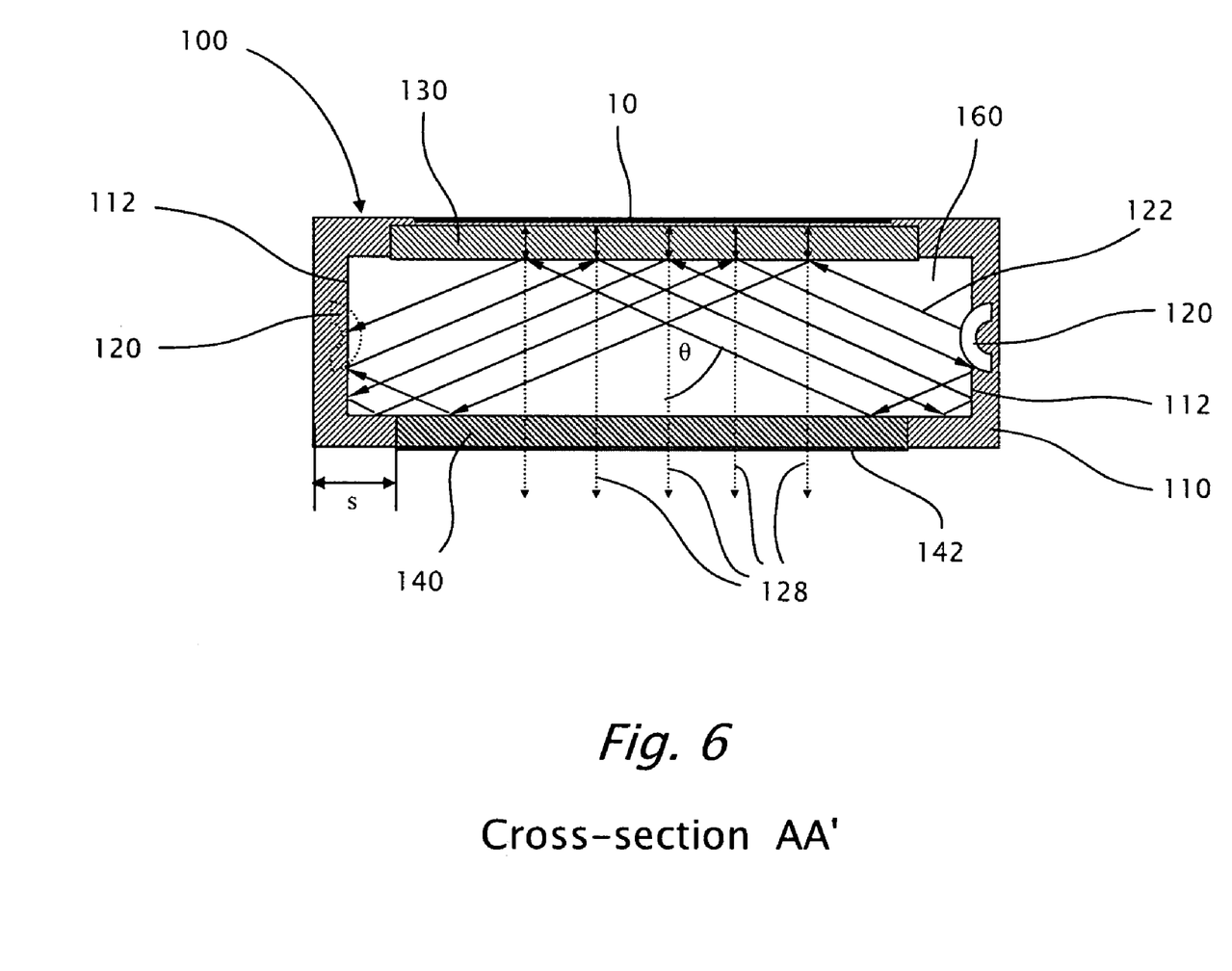
FIG. 6 is a top view cross section A-A' of the illumination chamber shown in FIG. 4.

Reference is also made to FIG. 6, which is a top view cross section A-A' of illumination chamber 100, as shown in FIG. 4. Rectangular 6-faced polyhedron housing 110 has a width w, height h, diagonal line m and depth d, whereas d is significantly smaller than m, in order to ensure that large angle of incidence $\theta_i$ of rays coming from light sources 120 hit the glass surface of window 140. The angle of incidence $\theta_i$ of the rays is larger than 45°, and is typically in the range of 80°-~90°. For example, in one embodiment the dimension of d is about 10 mm-15 mm, whereas the dimensions of w and h are in the range of 80 mm to 150 mm. Hence, most of rays 122, coming directly from light sources 120, hit the inner surface of glass 140 and reflect back into light mixing chamber 160. Only a small portion of rays 122, coming directly from light sources 120, hit the inner surface of glass 140 and travels through glass 140.

It should be noted that glass windows 130 and glass window 140 are disposed as part of the two larger faces of housing 110, having respective height and width dimensions h×w and diagonal line m. It should be further noted, that light sources 120 are disposed on the inner surface of the at least one of the four side walls 112 such that light sources 120 are preferably disposed relatively near glass 140 and distant from glass 130. Disposing light sources 120 near glass 140 increases the angle of incidence of rays 122 coming from light sources 120 and directly hitting the glass surface of window 140, and decreases the angle of incidence of rays 122 coming from light sources 120 and directly hitting the glass surface of window 130. Another option to control the angle of incidence of rays 122 coming from light sources 120 and directly hitting the glass surface of windows 130 and 140 is to change the width of margin s (see FIG. 6). For example, margin s can be increased to increase the angle of incidence of rays 122 coming from light sources 120 and directly hitting the glass surface of window 140, Some of rays 122 hit the opaque walls of housing 110 and reflect back into light mixing chamber 160. Eventually most of rays 122 hitting the opaque walls of housing 110 will travel to hit the inner surface of document 10, facing glass window 130 and proceed thereon towards glass window 140 and camera 50.

Some of rays 122 hit the inner surface of transparent glass 130 pass through the glass, and illuminate document 10. Rays 122 that illuminate document 10 at an incident angle at or near 0° return thorough transparent glass 130 towards glass 140, and proceed thereon towards glass window 140 and camera 50.

Figure 7A:
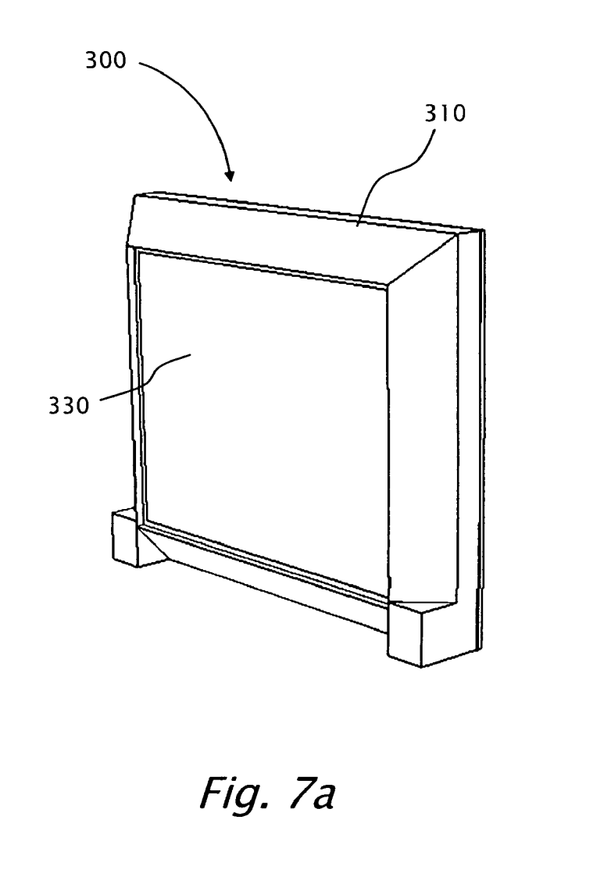
FIG. 7a illustrates a front (typically the document side) perspective view of an enclosed illumination chamber, according to the preferred embodiment of the present invention.
Figure 7B:
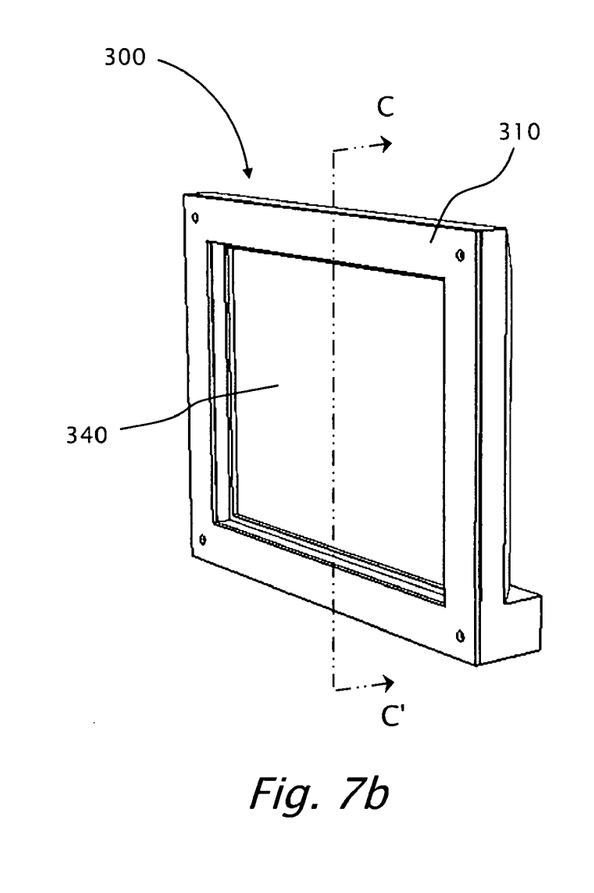
FIG. 7b illustrates a back (typically the camera side) perspective view of an enclosed illumination chamber, according to the preferred embodiment of the present invention.
Figure 8:
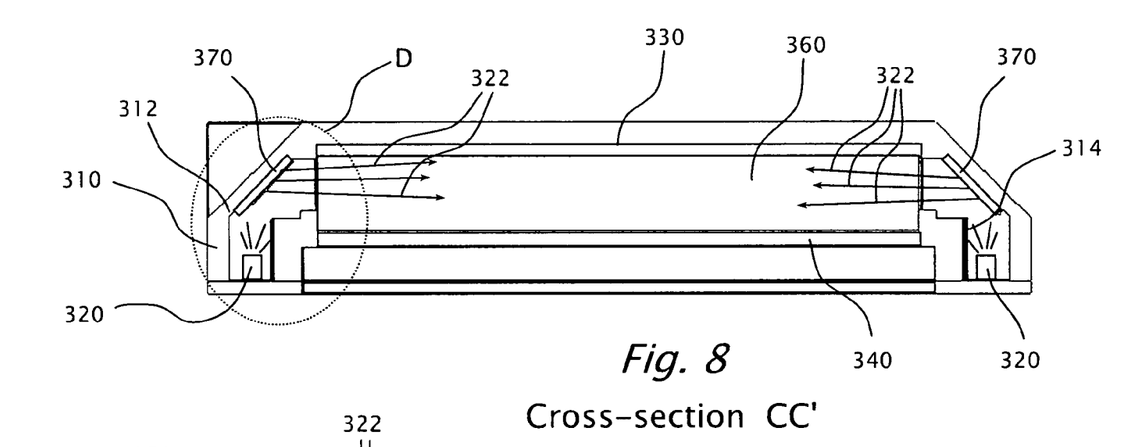
FIG. 8 is cross section C-C' of the illumination chamber shown in FIGS. 7a and 7b.
Figure 9:
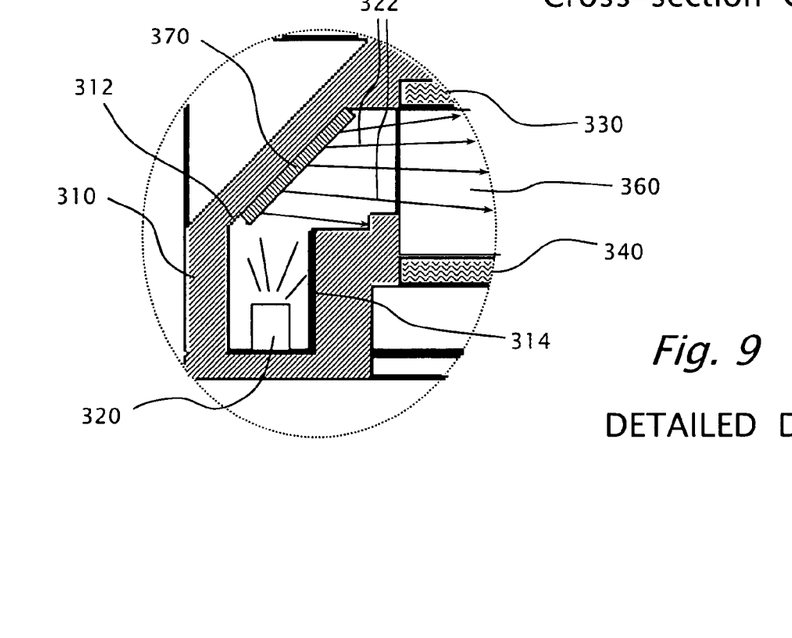
FIG. 9 is detailed window D shown in FIG. 8.

Referring now to FIGS. 7a and 7b, enclosed illumination chamber 300 is illustrated in a front (typically document 10 placement side) perspective view and back (typically the camera side) perspective view respectively, according to the preferred embodiment of the present invention. FIG. 8 illustrates a cross section C-C' of illumination chamber 300 and FIG. 9 illustrates detailed window D shown in FIG. 8. Illumination chamber 300 includes one or more light sources 320, glass window 330 and glass window 340 which are substantially parallel. Light source 320 is disposed in a cavity at the side of glass window 340 concealed from both glass window 330 and glass window 340 and illuminating generally perpendicular to glass window 340. Light source 320, does not illuminate directly into light mixing chamber 360 of illumination chamber 300, but rather towards inner wall 312, which have an inclination angle of substantially 45° with respect to glass windows 330 and 340. Inner wall 314 prevents light from reaching directly towards glass windows 330 and 340. Mirrors 370 are mounted on inclined inner walls 312 and most the light rays generated by light source 320 hits mirrors 370 and reflects into mixing chamber 360. Illumination chamber 300 enables reaching a higher incident angle by which ray 322 hit the surface of windows 330 and/or 340.

Figure 10:
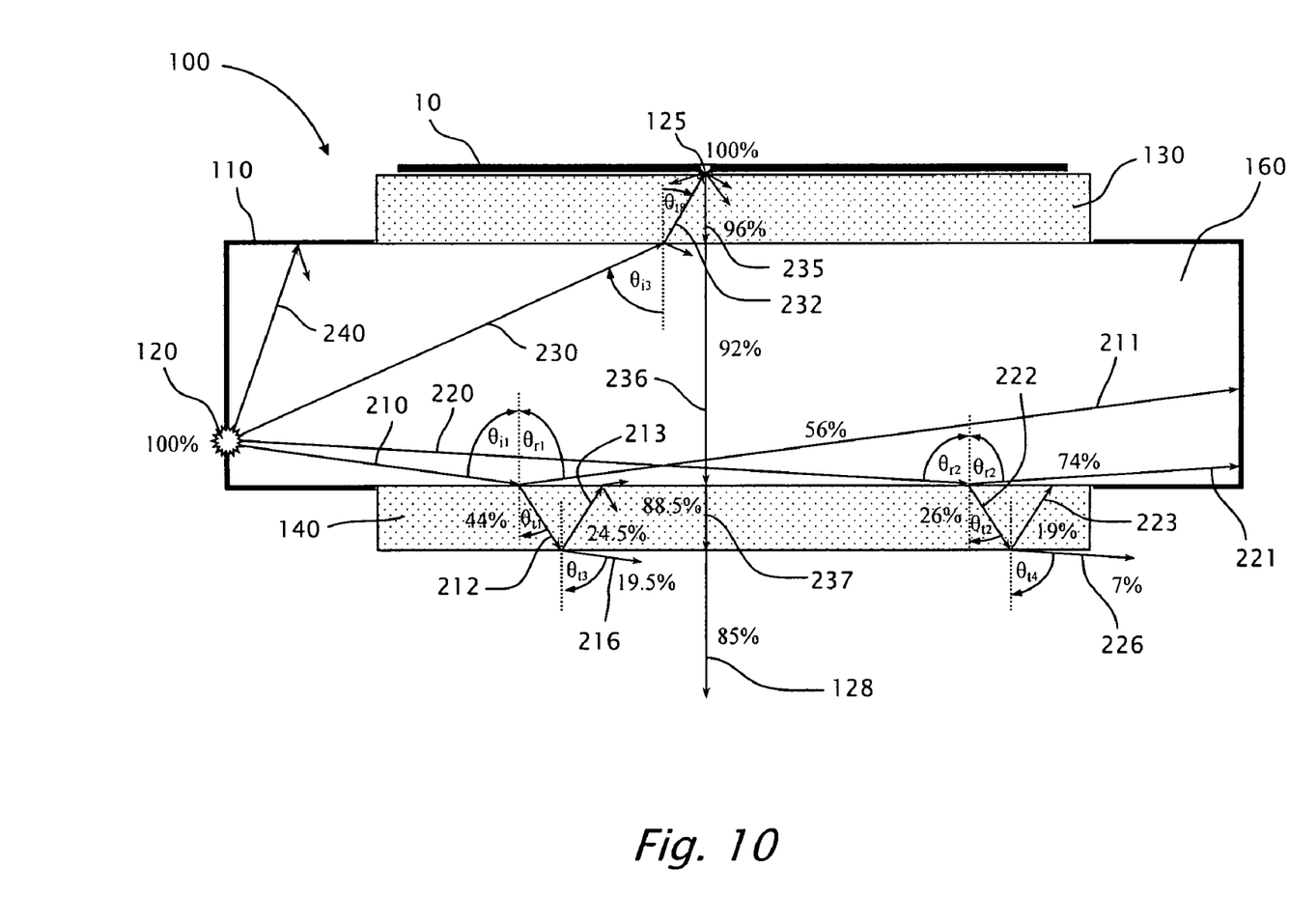
FIG. 10 schematically illustrates examples of the reflection and refraction of rays in the illumination chamber shown in FIG. 4.

Reference is now made to FIG. 10, which schematically illustrates examples of the reflection and refraction of rays in light mixing chamber 160 of illumination chamber 100. It should be noted the description herein refers to illumination chamber 100 by way of example only, and applies to illumination chamber 300 and other illumination chamber having a mixing chamber (160, 360) as described here above.

Reference is first made to example rays 210 and 220, which come out of light source 120 and hit glass window 140. Example ray 210 hits glass window 140 at an incident angle $\theta_{i1}$. In the example shown in FIG. 10, $\theta_{i1}$=84°. Upon hitting the surface of glass 140, ray 210 splits into reflective portion 211 and to refractive portion 212. Reflective portion 211 returns at an angle equal to $\theta_{r1}$, and refractive portion 212 proceeds inside glass 140 at an angle $\theta_{t1}$=41.5°. Reflective portion 211 contains 56% of the energy contained in ray 210, and refractive portion 212 contains 44% of the energy contained in ray 210. Ray 211 reflects back into light mixing chamber 160 and eventually, most of rays 211 will travel to hit the inner surface of document 10 and proceed thereon towards glass window 140 and camera 50. Ray 212 travels inside glass 140 until ray 212 hits the outer surface of glass sheet 140. Upon hitting the surface of glass 140, ray 212 splits into reflective portion 213 and to refractive portion 216. Reflective portion 213 returns at an angle equal to $\theta_{r1}$, and refractive portion 216 proceeds inside glass 140 at an angle $\theta_{t3}=84°$ ($\approx\theta_{t1}$). Reflective portion 213 contains 24.5% of the energy contained in ray 210, and refractive portion 216 contains 19.5% of the energy contained in ray 210. Ray 213 reflects back inside glass 140, hits the inner surface of glass 140, splits into a reflective portion and a refractive portion and so on and so forth.

Similar to ray 210, ray 220 also hits glass window 140 at an incident angle $\theta_{i2}$. In the example shown in FIG. 10, $\theta_{i2}=87°$. Upon hitting the surface of glass 140, ray 220 splits into reflective portion 221 and to refractive portion 222. Reflective portion 221 returns at an angle equal to $\theta_{r2}$, and refractive portion 222 proceeds inside glass 140 at an angle $\theta_{t2}=41.8°$. Reflective portion 221 contains 74% of the energy contained in ray 220, and refractive portion 222 contains 26% of the energy contained in ray 220. Ray 221 reflects back into light mixing chamber 160 and eventually, most of rays 221 will travel to hit the inner surface of document 10 and proceed thereon towards glass window 140 and camera 50. Ray 222 travels inside glass 140 until ray 222 hits the outer surface of glass sheet 140. Upon hitting the surface of glass 140, ray 222 splits into reflective portion 223 and to refractive portion 226. Reflective portion 223 returns at an angle equal to $\theta_{r2}$, and refractive portion 226 proceeds inside glass 140 at an angle $\theta_{r4}=87°$ ($\approx\theta_{t2}$). Reflective portion 223 contains 19% of the energy contained in ray 220, and refractive portion 226 contains 7% of the energy contained in ray 220. Ray 223 reflects back inside glass 140, hits the inner surface of glass 140, splits into a reflective portion and a refractive portion and so on and so forth.

Example ray 240 represents rays that come out of light source 120, hits the surface of opaque wall of housing 110 and reflects back into light mixing chamber 160. Eventually most of the energy of ray 240 will travel to hit the inner surface of document 10, facing glass window 130, and proceeds thereon towards glass window 140 and camera 50.

Example ray 230 represents rays that come out of light source 120, hit glass window 130 and Example ray 230 hits glass window 130 at an incident angle $\theta_{i3}$. In the example shown in FIG. 10, $\theta_{i3}=66°$. Upon hitting the inner surface of glass 130, ray 210 splits into a reflective portion and to refractive portion 232. Refractive portion 232 proceeds inside glass 130 at an angle $\theta_{t8}=37.5°$. Reflective portion 211 contains 13% of the energy contained in ray 230, and refractive portion 232 contains 87% of the energy contained in ray 230. Ray 232 travels inside glass 130 until ray 232 hits the outer surface of glass sheet 130, where document 10 is disposed. Upon hitting the outer surface of glass 130, ray 232 actually meets the inner surface of document 10.

According to the principle of Huygens, the point of incidence of ray 232 on the inner surface of document 10 can be considered as a new source of light, referred to hereon as light source 125. Considering now a ray coming out of light source 125 at an angle substantially perpendicular to the inner surface of document 10 and thereby substantially perpendicular to the inner and outer surfaces of glass 130 and to the inner and outer surfaces of glass 140. When the perpendicular ray hits the outer surface of glass 130, the ray splits into a reflective portion, which contains 4% of the energy of the ray, and to refractive portion 235, which contains 96% of the energy of the ray coming out of light source 125. The reflective portion returns substantially straight back to light source 125 and reflects back in the path of ray 235. 96% of the reflected energy (of the returning 4%) proceeds behind ray 235 towards glass window 140. Hence substantially most of the energy of the ray coming out of light source 125 proceeds to travel towards glass window 140 and then to camera 50.

Ray 235 travels inside glass sheet 130 until ray 235 hits the outer surface of glass 140. Upon hitting the outer surface of glass 140, ray 235 splits into a reflective portion, which contains 4% of the energy of ray 235, and to refractive portion 236, which contains 96% of the energy of ray 235, being 92% of the energy of the ray coming out of light source 125. Ray 236 travels inside light mixing chamber 160 until ray 236 hits the inner surface of glass 140. Upon hitting the inner surface of glass 140, ray 236 splits into a reflective portion, which contains 4% of the energy of ray 236, and to refractive portion 237, which contains 96% of the energy of ray 236, being 88.5% of the energy of the ray coming out of light source 125. Ray 237 travels inside glass sheet 140 until ray 237 hits the outer surface of glass 140. Upon hitting the outer surface of glass 140, ray 237 splits into a reflective portion, which contains 4% of the energy of ray 237, and to refractive portion 128, which contains 96% of the energy of ray 237, being 85% of the energy of the ray coming out of light source 125. Rays 128 that do pass through window glass 140 carry the image of document 10 and are preferably directed towards a viewer such as a camera 50, which can be embodied using, for example, folding mirrors or prisms, to keep the imaging device small in size. The path to the viewer should be substantially dark to allow substantially only rays 128 to reach the viewer.

Figure 11:
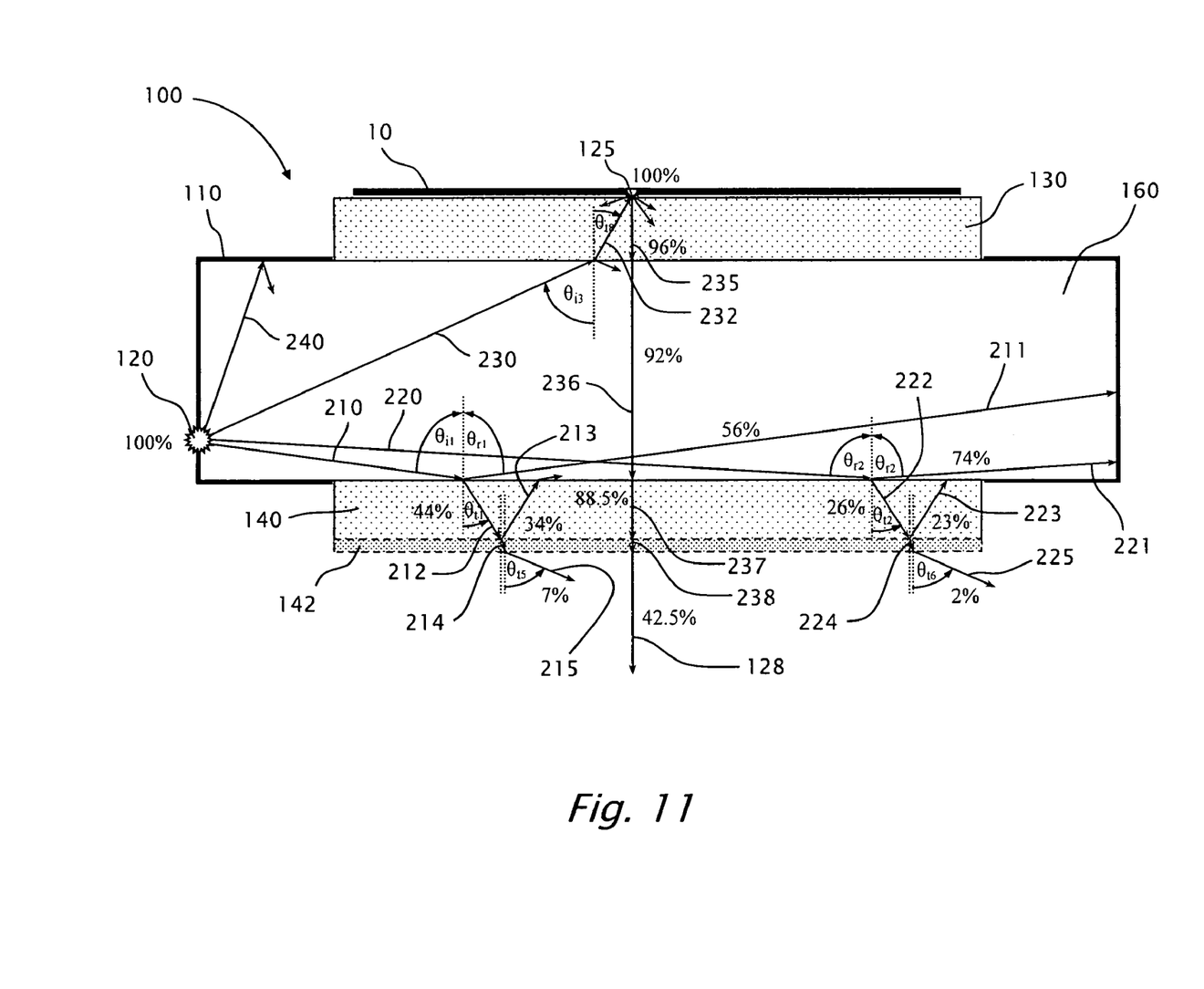
FIG. 11 schematically illustrates examples of the reflection and refraction of rays in the illumination chamber shown in FIG. 4, whereas the glass at the camera side is coated with a partially transparent material.

In embodiments of the present invention, glass window is coated with materials having a refractive index n typically in the range of 2.7-5.0, and thereby converting glass window 140 to a partially transparent. Partially transparent glass window 140 enables to further reduce the light energy than transmits through glass window 140 being directly illuminated by light sources 120. Reference is now made to FIG. 11, which schematically illustrates examples of the reflection and refraction of rays in light mixing chamber 160 of illumination chamber 100, whereas glass 140 at the camera side is coated with a layer 142 of partially transparent material (refractive index n is typically in the range of 2.7-5.0). As in the example shown in FIG. 10, when ray 212 reaches layer 142, ray 212 splits into reflective portion 213 and to refractive portion 214. Reflective portion 213 returns at an angle equal to $\theta_{r1}$, and refractive portion 214 proceeds inside glass 140 at an angle $\theta_{t3}=84°$ ($\approx\alpha_{t1}$). But as a result of layer 142, the reflective energy contained in portion 213 increases to 34% of the energy contained in ray 210, and refractive portion 214 contains 10% of the energy contained in ray 210.

When ray 214 reaches the outer surface of layer 142, ray 214 splits a reflective portion 213 and to refractive portion 215. Refractive portion 215 proceeds inside glass 140 at an angle $\theta_{t5}>84°$ ($\theta_{t1}$). But as a result of layer 142, the energy contained in portion 215 decreases to 7% of the energy contained in ray 210.

Similarly, the reflective energy contained in portion 213 increases to 23% of the energy contained in ray 210, the energy contained in portion 215 decreases to 2% of the energy contained in ray 210, and the energy contained in ray 128 decreases to 42.5% of the energy contained in ray coming out of light source 125.

Figure 12:
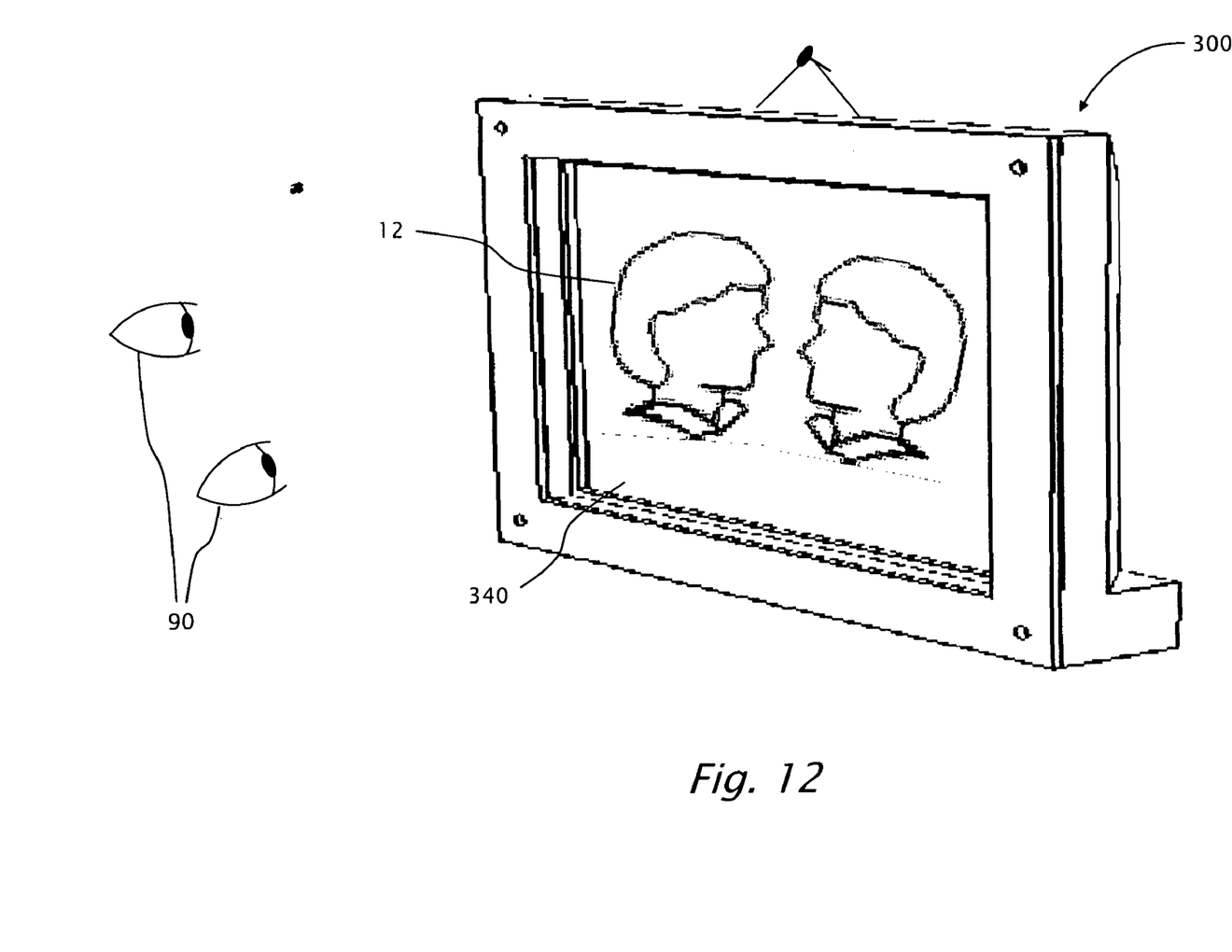
FIG. 12 illustrates a perspective view of an example enclosed illumination chamber, mounted on a picture hanging on a wall, according to variations of the present invention.

An aspect of the present invention is to provide methods of using the illumination chambers (100, 300) of the present invention to uniformly illuminate pictures. FIG. 12 illustrates a perspective view of an example enclosed illumination chamber 300, mounted on picture 12 hanging on a wall, according to variations of the present invention. Chamber 300 is mounted on picture 12 such that the viewed surface of picture 12 is disposed immediately adjacent to the external surface of the object transparent glass sheet (not shown). Chamber 300 illuminates the viewed surface of picture 12 with uniform illumination, whereas picture 12 can be viewed by viewers 90 through image glass window 340.

It should be note that the present invention is not limited to LED light sources 120 and any other type of light sources 120, including halogen, lasers and fiber optics, can be used. Object 10 can be illuminated with excitation light in UV, NUV and other wave length as required.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A light mixing chamber for illuminating an object with substantially uniform illumination, the light mixing chamber comprises a generally rectangular 6-faced polyhedron housing comprising:
   (a) a first face comprising an object transparent glass sheet;
   (b) a second face comprising an image transparent glass sheet;
   (c) four side walls; and
   (d) at least one light source disposed inside said housing, wherein said object transparent glass sheet is substantially parallel to said image transparent glass sheet; and
   wherein the distance between said object transparent glass sheet and said image transparent glass sheet, being the depth of said housing, is substantially smaller than the diagonal dimension of said first and second faces.

2. The light mixing chamber of claim 1, wherein said 6-faced polyhedron housing is generally a rectangular parallelepiped.

3. The light mixing chamber of claim 2, wherein the ratio between said depth of said housing and said diagonal dimension of said first and second faces is at least 1:4.

4. The light mixing chamber of claim 1, wherein said object is a document.

5. The light mixing chamber of claim 1, wherein said object is a picture.

6. The light mixing chamber of claim 1, wherein said at least one light source is a LED light source.

7. The light mixing chamber of claim 1, wherein said at least one light source is a halogen light source.

8. The light mixing chamber of claim 1, wherein said at least one light source is selected from the group of light sources type consisting of: Infra Red (IR), ultra violet (UV), near UV (NUV), visible light and fluorescence light.

9. The light mixing chamber of claim 2, wherein said at least one light source is disposed closer to said image transparent glass sheet with respect to said object transparent glass sheet, and wherein said light source illuminates said image transparent glass sheet with an incident angle larger than 80°.

10. The light mixing chamber of claim 2, wherein a margin made of opaque material is disposed between the edge of said image transparent glass sheet and the edge of the nearest housing side wall having at least one of said light sources, wherein the width of said margin is selected such that said at least one light source illuminates said image transparent glass sheet with an incident angle larger than 80°.

11. The light mixing chamber of claim 1, wherein at least a portion of the inner side walls of said housing are covered by white and optically diffusive material.

12. The light mixing chamber of claim 11, wherein a light reflector is disposed behind one or more of said light sources, on said inner side wall of said housing, where said light source is disposed.

13. The light mixing chamber of claim 1, wherein at least a portion of the inner side walls of said housing are covered by white and optically brilliant material.

14. The light mixing chamber of claim 13, wherein said optically brilliant material is a mirror is disposed on at least a portion of an inner side wall of said housing.

15. The light mixing chamber of claim 1, wherein a mirror is disposed on an inner side wall of said housing opposing another inner side wall of said housing, on which one or more of said light sources are disposed.

16. The light mixing chamber of claim 1, wherein said side walls of said 6-faced polyhedron housing are inclined at an inclination angle of 45° with respect to said glass sheets; wherein mirrors are mounted on the inner side walls of said inclined side walls; wherein said light source emits light at an angle generally perpendicular to said image glass sheet and illuminates said mirrors, and thereby, most the light rays generated by said light source hit said mirrors and reflect into said mixing chamber.

17. The light mixing chamber of claim 16, wherein a concealing inner side wall prevents light emitted from said light source from reaching directly said object transparent glass sheet and said image transparent glass sheet.

18. The light mixing chamber of claim 1, wherein all walls of said housing are opaque, except for said object transparent glass sheet and said image transparent glass sheet.

19. The light mixing chamber of claim 1, wherein said image transparent glass sheet is made of partially transparent glass.

20. The light mixing chamber of claim 1, wherein said light mixing chamber illuminates an object and thereby forms an image in an imaging apparatus.

21. The light mixing chamber of claim 20, wherein said object is mounted immediately adjacent to the external surface of said object transparent glass sheet.

22. The light mixing chamber of claim 1, wherein said light mixing chamber illuminates a picture; and wherein said picture is disposed immediately adjacent to the external surface of said object transparent glass sheet.

* * * * *